United States Patent
Arvelo, Jr. et al.

(10) Patent No.: US 7,187,619 B2
(45) Date of Patent: Mar. 6, 2007

(54) METHOD AND APPARATUS FOR HIGH-FREQUENCY PASSIVE SONAR PERFORMANCE PREDICTION

(75) Inventors: Juan I. Arvelo, Jr., Dayton, MD (US); Patrick A. Ferat, Laurel, MD (US); Leslie Mobley, Sterling, VA (US)

(73) Assignee: The Johns Hopkins University, Baltimore, MD (US)

( * ) Notice: Subject to any disclaimer, the term of this patent is extended or adjusted under 35 U.S.C. 154(b) by 0 days.

(21) Appl. No.: 10/544,747

(22) PCT Filed: Mar. 11, 2004

(86) PCT No.: PCT/US2004/007392

§ 371 (c)(1),
(2), (4) Date: Aug. 8, 2005

(87) PCT Pub. No.: WO2005/015369

PCT Pub. Date: Feb. 17, 2005

(65) Prior Publication Data

US 2006/0193202 A1   Aug. 31, 2006

Related U.S. Application Data

(60) Provisional application No. 60/455,653, filed on Mar. 18, 2003, now abandoned.

(51) Int. Cl.
*H04B 17/00* (2006.01)
*H04B 11/00* (2006.01)
(52) U.S. Cl. .................................. 367/13; 367/131
(58) Field of Classification Search .............. 367/13, 367/131

See application file for complete search history.

(56) References Cited

U.S. PATENT DOCUMENTS

| | | | |
|---|---|---|---|
| 4,034,483 A | 7/1977 | Bernstein | 434/9 |
| 4,973,252 A | 11/1990 | Krueger | 434/6 |
| 5,640,369 A | 6/1997 | Capell, Sr. | 367/88 |
| 5,978,646 A | 11/1999 | Weinberg | 434/6 |
| 5,978,647 A | 11/1999 | Weinberg | 434/6 |
| 5,983,067 A | 11/1999 | Weinberg | 434/6 |
| 5,995,803 A | 11/1999 | Weinberg | 434/6 |

(Continued)

FOREIGN PATENT DOCUMENTS

DE      4209936      9/1993

(Continued)

*Primary Examiner*—Ian J. Lobo
(74) *Attorney, Agent, or Firm*—Benjamin Y. Roca

(57) ABSTRACT

A system and method for predicting passive, high-frequency sonar array performance at any underwater location, implemented as a software package running on a computer. An operator selects an arbitrary geographical location, specifies a sonar array and defines a target. The necessary bathymetry, and associated oceanographic, environmental and meteorological data are automatically acquired or generated, along with appropriate models for ocean surface and bottom reflectivity, and vertical noise directionality. A Comprehensive Acoustic System Simulation (CASS) software module performs appropriate ray tracing, which is used to produce Cross-Spectral Density (CSD) matrices for the target and the anisotropic ambient noise. These are used to generate graphic and numeric representations of the array's performance at the selected location. A time of year may also be specified and the appropriate anisotropic noise field for conditions expected at that location at that time of year will be generated. Shipping realizations may be incorporated.

22 Claims, 3 Drawing Sheets

U.S. PATENT DOCUMENTS

| | | | |
|---|---|---|---|
| 6,002,914 A | 12/1999 | Weinberg | 434/6 |
| 6,096,085 A | 8/2000 | Sammelman | 703/2 |
| 6,285,628 B1 | 9/2001 | Kiesel | 367/138 |
| 6,430,104 B1 * | 8/2002 | Rosario | 367/13 |
| 2002/0133329 A1 | 9/2002 | Kano et al. | 703/22 |
| 2003/0013069 A1 | 1/2003 | Lengua | 434/6 |

FOREIGN PATENT DOCUMENTS

| | | |
|---|---|---|
| JP | 410256981 A | 9/1998 |
| JP | 411259790 A | 9/1999 |
| WO | WO 93/00647 | 1/1993 |

* cited by examiner

METHOD AND APPARATUS FOR HIGH-FREQUENCY PASSIVE SONAR PERFORMANCE PREDICTION

CROSS-REFERENCE TO RELATED APPLICATIONS

This application claims the benefit of prior filed now abandoned U.S. application No. 60/455,653, filed on Mar. 18th, 2003, the entire contents of which are hereby incorporated by reference.

BACKGROUND OF THE INVENTION

1. Field of the Invention

The present invention relates generally to the field of predicting sonar performance, and more particularly to systems and methods of predicting the performance of high-frequency, passive sonar arrays in the open ocean and in shallow water coastal sites.

2. Description of the Related Art

Sonar, a well known technology in which sound waves are used for detecting objects, has found extensive application in maritime environments. Sonar systems can be broadly divided into two types: active sonar and passive sonar. An active sonar system includes a sound source, which emits bursts of sound, and an array of receivers which listen for the reflection of the emitted sound from an object. A passive sonar system has no sound source and relies on its array of receivers to detect sound emitted by the object being sought. A passive sonar system can only detect objects emitting sounds louder than the ambient noise of the environment, but has the major advantage over active sonar systems of not revealing its presence or location.

The choice of what frequency of sound waves to listen for in a passive, underwater sonar system is to a large extent a tradeoff between range and cost. The greatest range is obtained by listening for the lowest frequency sound waves, as the distance sound propagates in water is inversely proportional to the frequency of the sound wave, primarily because of lower absorption. However, the size and cost of sonar arrays is also generally inversely proportional to the frequency of the sound waves being detected.

Throughout the cold war, a major objective of US Naval sonar was to conduct long range, deep ocean surveillance. A majority of the passive sonar systems designed and used by the US Navy during that period were used for locating objects at a range of several hundred miles in deep ocean conditions, and these systems operated by detecting low frequency sound waves, in the range of 100–300 Hz. At these frequencies, the dominant source of ambient noise is due to distant shipping rather the noise generated by the ocean surface. Given the contribution of many distant ships to the ambient field in deep ocean areas, a common assumption is that the ocean's ambient noise at low frequencies is isotropic, i.e. that it is the same in all directions.

The end of the cold war has lead to an increased need for detecting objects in shallow water at much shorter ranges, typically of the order of 1 to 50 miles. At these ranges, higher frequency sonar systems, operating in the 1–20 kHz range, have significant potential advantages, including reduced size and cost. However, predicting the performance of such sonar systems requires major changes in the modeling methods. Firstly, higher frequency predictions generally require ray-based rather than wave-based modeling techniques. Secondly, the databases that describe surface and bottom interactions at low frequencies may not be applicable for use at higher frequencies. Thirdly, the ambient noise at higher frequencies and in coastal areas can also be significantly anisotropic, i.e. it can vary depending on the direction in which the sonar is "looking".

The reason for this anisotropy can be understood by considering how ocean ambient noise is produced and propagated. At these higher frequencies of 1–20 kHz, the primary sources of ambient noise is wind-wave activity. In certain locations, nearby shipping can also be a source of noise. The ambient noise level is related to how well all of these surface sound sources propagate through the water to the receiver. This propagation can be predicted if the bathymetry and the sound speed structure of the water columns in the region of interest are known. In particular, the nature and degree of interaction of the propagating sound with the ocean surface and the ocean floor dictates how the ambient noise level varies with listening angle. When listening up towards the surface, a sonar array listens directly to the primary sources of the ambient noise, resulting in high noise levels. When listening straight down, the noise level is lower because of the loss associated with the reflection off the ocean floor (also known as "bottom loss"). At angles in between, the noise level varies, depending on factors such as the receiver depth, the local bathymetry or ocean depth, sea bed reflectivity and sound speed profile. In particular, in downward refracting environments there is a minimum, or "noise notch", of significantly quieter background noise at or near the horizontal plane. Since the ambient noise sets the limit on what other noise sources can be detected by a passive sonar system, it is necessary to accurately model that ambient noise, including its directionality, in order to provide a realistic simulation of a passive sonar system's performance. Methods exist for simulating reverberation in multi-path sonar such as, but not limited to, the system described in U.S. Pat. No. 6,002,914 issued to Weinberg on Dec. 14th, 1999 entitled "Method and Apparatus for Simulating Reverberation in a Multi-path Sonar System", the contents of which are hereby incorporated by reference. However, there is no practical system for modeling the anisotropic ambient ocean noise in the 1–20 kHz frequency range and therefore no practical system for accurately simulating the performance of passive sonar arrays at these frequencies.

What is needed is a system and method that can automatically obtain and integrate the bathymetry and oceanographic data of a defined area with known or predicted weather, sea-surface and shipping patterns for that area, and use the integrated data to the performance of a chosen sonar system including the effects of the anisotropic wind-wave and shipping noise. Such a system would solve the problem of how to efficiently and accurately predict high-frequency sonar performance at arbitrary locations, including shallow water locations near coastal shelves.

SUMMARY OF THE INVENTION

The present invention relates to a system and method for predicting how a passive, high-frequency sonar array will perform at any underwater location in the world.

In a preferred embodiment, the present invention is implemented as a software package running on a computer. Using the software, an operator may select an arbitrary geographical location, specify a passive sonar array and define a target to be detected. The software package then automatically obtains the necessary bathymetry and environmental data, including any necessary oceanographic and meteorological data, for the selected location, either from default databases incorporated in the software package or by automatically importing the required data from standard databases specified by the user.

Using this data and appropriate models for ocean surface and bottom reflectivity, a ray tracing program such as the well-known Comprehensive Acoustic System Simulation (CASS) software module, is used to generate ray traces. The results of the CASS raytracing are used by a wind-wave vertical noise directionality (VND) module to compute the a wind-wave vertical noise directionality. This wind-wave VND provides a measure of the noise arriving at the selected location of the sonar array from any direction in both the vertical and azimuth. The anisotropic ambient wind-wave noise Cross-Spectral Density (CSD) module makes use of the wind-wave noise VND to create a wind-wave noise CSD matrix for the specific receiver array specified by the user.

In a similar fashion, when the a shipping realization is specified in the form of a location of one or more ships and their type and speed, a shipping noise CSD matrix is created. This includes creating a shipping noise VND using the CASS ray-tracing output of sound propagating from the individual ships.

Similarly a target CSD module is created based on the CASS raytracing output of sound propagating from the target in the bathymetry of the selected geographical location.

An array response module then uses the wind-wave and shipping noise CSDs and the target CSD to calculate the performance of the sonar array operating at the selected location in detecting the specified target. This performance may for instance be calculated in the form of response curves which characterize particular aspects of the sonar array performance including, but not limited to, array response versus elevation or array response versus azimuth plots. By this means this invention calculates how the sonar, specified by the operator, will perform at the selected location. The package supplies the results of the calculations to the operator as graphic and numeric representations characterizing the performance of the specified sonar system at the selected location.

In a preferred embodiment of the invention, the operator may also select a time of year by entering a date, and the software package will create the appropriate wind-wave noise CSD for the specified sonar array operating in conditions expected at that location at that time of year, or for the historic conditions recorded at the specified location on that date.

Further details and advantages of the present invention will be described in the detailed description below.

DETAILED DESCRIPTION

The present invention is related to a system and method for simulating the performance of sonar arrays, in particular simulating the performance of high-frequency (1 kHz–20 kHz), passive sonar systems.

In a preferred embodiment of the invention, it is implemented as a software package running on a computer. A user interacts with this software package via a Graphic User Interface (GUI) which allows them to select variables relevant to the sonar system's performance including, but not limited to, the location of the sonar, the type of sonar, the type of object being sought and the time of year. The system then obtains the necessary data including, but not limited to, the necessary bathymetry, oceanographic, meteorological and sonar system data. This data is obtained either from default databases associated with the program or compatible, user defined databases.

The software system of this invention can then processes this data using a sound propagation model such as, but not limited to, the CASS/GRAB ray-based model [Oceanographic And Atmospheric Master Library Summary (U), Naval Oceanographic Office report OAML-SUM-21J, October 2001]. Such a sound propagation model is capable of ray-tracing high-frequency (1–20 kHz) sound propagation in complex environments with sufficient accuracy to provide a map of the directionality of all sound sources, including ambient noise. Such a map of the sound arriving at a particular location from any direction in vertical or azimuth is termed a vertical noise directionality (VND). This calculation is particularly important in shallow water locations close to the continental shelves, where the ambient noise can be very anisotropic. As ambient noise level sets the limit of object detectability for passive sonar systems, it is important to accurately model the directionality of the ocean's ambient noise in order to accurately predict or simulate sonar system performance.

The results of the sound propagation modeling can be supplied to the user as, for instance visual graphics and charts such as well known sound-speed profiles or eigenray plots. The VNDs for both wind-wave and shipping noise can also be used to provide cross-spectral density matrices for sonar arrays and these in turn can be used to model sonar performance at the selected location. The results of the sonar modeling are then returned to the user and displayed on the GUI as graphical plots or graphs, such as, but not limited to, graphs showing detected signal versus sonar steering angle or sonar beam patterns.

An exemplarily embodiment of the invention will be described by reference to the attached diagrams, in which like numbers refer to like elements.

Figure 1:
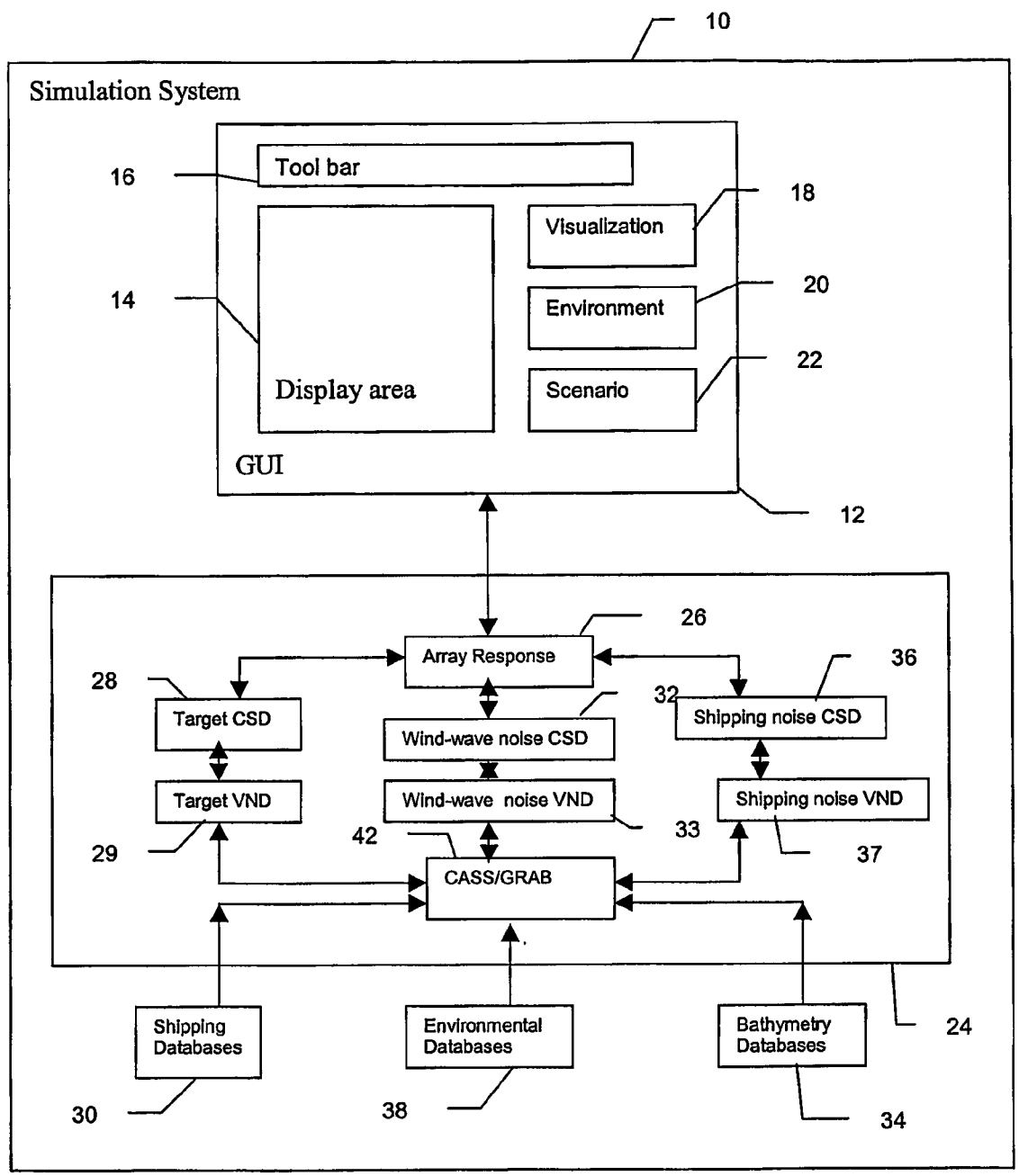
FIG. 1 is a schematic drawing of a representative embodiment of the present invention.

FIG. 1 shows a sonar simulation system 10, having a GUI 12. In the preferred embodiment, the GUI 12 has a display area 14, a tool bar 16, a visualization menu region 18, an environment menu region 20 and a scenario menu region 22. The GUI 12 interacts with a computer 24, on which there is an array response module 26, a target Cross-Spectral Density (CSD) module 28, a target Vertical Noise Directionality (VND) module 29, a wind-wave CSD module 32, a wind-wave VND module 33, a shipping noise CSD module 36, a shipping noise VND module 37 and a CASS Gaussian RAy Bundle (GRAB) propagation module 42. The computer 24 may include or may be linked to a number of databases, including shipping databases 30, bathymetry databases 34 and environmental databases 34.

In a preferred embodiment, GUI 12 may be a standard graphic user interface, such as, but not limited to a suitably customized MATLAB® GUI supplied by The Mathworks, Inc, Natick, Mass. 01760-2098, USA. GUI 12 may be displayed on a computer monitor, which may be remote from the computer 24 on which the central processing module 26 is running. The GUI 12 may be linked to computer 24 via a network and if necessary, operating via appropriate virtual network software. The display area 14's default display, visible on initialization, is typically a map of the world's oceans. The GUI tool-bar 16 may have a number of pull-down menus that allow a user to interact with the array response module 26. In a preferred embodiment, the tool-bar 16 options may include "File", "Edit", "Environment", "Eigenrays", "Pressure", "Reverberation" and "Signal Excess". Typically, on initialization, the only option available to the user is the "File" menu, that allows the user to either enter data manually via the visualization menu region 18, the environment menu region 20 or the scenario menu region 22, or to load a file of pre-stored data. The other options may then become available once data has been processed, and may allow the user to view specific results or to view the results in a variety of specific ways, as discussed later.

The visualization menu region 18, typically allows the user to select a specific region of interest by for instance entering coordinates specifying a latitude and longitude. In the preferred embodiment, the region of interest is specified by entering latitude and longitude for the four boundaries of the region, i.e., northern boundary, southern boundary, eastern boundary and western boundary. Other methods of specifying location may include, but are not limited to, specifying a latitude, longitude for the mid-point of a region of interest and a distance specifying a radius or a range of the region of interest. The user may also select the region using the world map in the display area 14 using a mouse and associated buttons to click on a location and zoom in or out. The visualization menu region may also allow the user to specify a time of year by entering a date. This date may simply be a month of the year or it may include a specific time such as, but not limited to, the time of day or night.

The environment menu region 20 may also allow the user to select how the selected region will be modeled using options such as "Surface", "Volume", "Bottom", "Models", "Speed Profile" and "Bathymetry" to specify databases and models to be used. For all options, there are typically default selections which the user may opt to use. For instance, the "Surface" menu selection typically allows the user to specify models to be used such as, but not limited to, a surface reflection model, a surface scattering model and a wind-wave condition model. In the preferred embodiment the default model to use in surface reflection calculations is that described in "APL-UW High-Frequency Ocean Environmental Acoustic Models Handbook", APL/UW Technical Report 9407 (1994), Section 20. The preferred default model to use in surface scattering calculations is that "APL-UW High-Frequency Ocean Environmental Acoustic Models Handbook", APL/UW Technical Report 9407 (1994), Section 2, the contents of which are hereby incorporated by reference. The default database for wind and wave conditions in the preferred embodiment is the Surface Marine Gridded Climatology Database (SMGC) described in, for instance, "Oceanographic and Atmospheric Master Library Summary (U), Naval Oceanographic Office report OAML-SUM-21J, October 2001, Section 3.6. the contents of which are hereby incorporated by reference.

The "Volume" menu typically allows the user to specify a model to be used in calculating the volume absorption or scattering of the sound. In the preferred embodiment, the default volume absorption values are obtained from the tables in "APL-UW High-Frequency Ocean Environmental Acoustic Models Handbook", APL/UW Technical Report 9407 (1994), FIG. 3, the contents of which are hereby incorporated by reference.

The "Bottom" menu typically allows the user to specify the database to be used in bottom reflection calculations. In the preferred embodiment, the default bottom reflection database is the High-Frequency Bottom Loss Database (HFBL) as described in, for instance, "Oceanographic And Atmospheric Master Library Summary (U), Naval Oceanographic Office report OAML-SUM-21J, October 2001, Section 3.1, the contents of which are hereby incorporated by reference. The "Bottom" menu may also allow the user to specify a model to be used in calculating bottom scattering of acoustic waves. In the preferred embodiment, the default model for bottom scattering is that described in "APL-UW High-Frequency Ocean Environmental Acoustic Models Handbook", APL/UW Technical Report 9407 (1994), Section 4, the contents of which are hereby incorporated by reference.

The "Models" menu may also allow the user to specify the model to be used in calculating acoustic propagation. In the preferred embodiment, acoustic propagation is modeled using an appropriate ray-trace package such as, but not limited to, the well-know CASS/GRAB acoustic ray-trace package.

The "Speed Profile" option may allow the user to select a database to use for looking up sound speed versus ocean depth. In the preferred embodiment, the default database for sound speed profiles is the Generalized Digital Environmental Database (GDEM). The GDEM database is available through the "Oceanic and Atmospheric Master Library Summary", Navel Oceanographic Office, Systems Integration Division, Stennis Space Center, MS. 39522-5001(October 2002).

The "Bathymetry" option may allow the user to select an appropriate bathymetry database and specify a resolution for plotting the bathymetry. In the preferred embodiment, the default bathymetric database is the Digital Bathymetric Data Base Variable resolution (DBDBV) database as described in, for instance, the "Oceanographic And Atmospheric Master Library Summary" (U), Naval Oceanographic Office report OAML-SUM-21J, October 2001, Section 3.7.

The scenario menu region 22 typically allows the user to enter the data specifying the sonar, including, but not limited to, receiver array pattern, coordinates and depth of sources and targets, and information for any shipping realizations such as, but not limited to, vessel type, size, velocity, location and heading. The scenario menu may also allow the information to be loaded from predefined files, if available.

The information entered by the user is relayed to the array response module 26, which is a software module running on a hardware platform. The array response module 26 controls and interacts with other modules which may themselves be MATLAB modules or collections of MATLAB functions. When the user specifies a region of interest, the array response module 26 updates the display area 14 with the appropriate graphic map display. The array response module may also cause other modules such as the CASS/GRAB module 42, to obtain or generate appropriate environmental data stored in the environmental databases 38, such as, but not limited to, sound speed versus depth profiles, the GDEM, DBDBV and HFBL databases. In the preferred embodiment, the environmental database 38 is also capable of optionally importing raw expendable BathyThermograph (XBT) and expendable Conductivity-Temperature-Depth (XCTD) data after it has been appropriately integrated and processed by an appropriate package such as, but not limited to, System for At-Sea Environmental Analysis (SASEA) package. This data from the environmental databases 38, including appropriate oceanographic and environmental data, along with any necessary data from the shipping databases 30 and the bathymetry databases 34, may be used by the CASS/GRAB module 42 to generate ray-tracing appropriate to the specific location chosen by the user and the requirements of the associated wind-wave noise VND, shipping noise VND and target VND modules.

The results of the CASS/GRAB module 42's ray-tracing can be used by the wind-wave noise VND module 33 to provide a wind-wave noise VND model. This VND model is essentially a map of the magnitude of the noise from all applicable wind-wave noise sources as seen "looking" out in any given direction in vertical or azimuth from a specific point. This wind-wave noise VND model is particularly important in shallow coastal waters when considering sound in the low kHz range, as this is the predominant ambient sound at these wavelengths and the directionality is highly anisotrophic and dependent on local bathymetry and environmental details. The wind-wave noise CSD module 32 can then use the anisotrophic wind-wave noise VND at the array location, along with the specified details of the sonar system such as, but not limited to, the array pattern and spacing, to generate a wind-wave noise CSD matrix, which is a well-known mathematical formulation that can be used by the array response module 26.

Analytic wind-wave VND models are generally known. However, there use is generally limited to situations in which the bathymetry has no range dependence, i.e. the ocean floor can be assumed to be uniformly flat. In such circumstances, analytic equations may be used to predict acoustic propagation instead of raytracing. One such analytic model is based on the spatial coherence equation derived by C. H. Harrision in "Formulas for ambient noise level and coherence", J. Acoust. Soc. Am. 99 (4) p 2005 (2001), the contents of which are hereby incorporated by reference, can be used. The spatial coherence equation may be represented as:

$$\rho(d, \gamma) = 2\pi \int_0^{\pi/2} \frac{e^{ikd \sin(\phi_r)\sin(\gamma)} e^{-as_p} + R_b e^{-ikd \sin(\phi_r)\sin(\gamma)} e^{-a(s_c - s_p)}}{[1 - R_s R_b e^{-as_c}]} \times \quad (1)$$
$$J_o(kd \cos \phi_r \cos \gamma) \sin^{2m-1} \phi_s \cos \phi_r d\phi_r$$

where k is the wavenumber, d is the element separation, γ is the element pair orientation, $\phi_r$ is the vertical angle at the receiver measured from the horizontal, $\phi_s$ the vertical angle of the surface source measured from the horizontal, 2m−1 is the surface source directivity exponent of the sine function, $R_s$ and $R_b$ are the surface and bottom plane-wave reflection coefficients, respectively. The exponential terms containing a are absorption losses for the ray paths $s_c$ and $s_p$.

This general equation may be modified to produce analytic equations for the VND for each solid angle component cos(φ)dφ which have the form:

$$VND(\phi_r^-) = \frac{A_s \cdot l_D \cdot D(\phi_s)}{\sin \phi_s \cdot (1 - R_s(\phi) \cdot R_b(\phi) \cdot l_C)} \quad (2)$$

and, $$VND(\phi_r^+) = R_b(\phi) \cdot l_{DC} \cdot VND(\phi_r^-) \quad (3)$$

where $A_s$ is the scaled surface source strength applicable to an arbitrary surface source directivity D. The terms $l_D$, $l_C$ and $l_{DC}$ represent the absorptive losses of the surface to receiver ray, the ray path cycle distance and the difference path, respectively. (Negative angles look up).

Equations 2 and 3 constitute an analytic VND model that can be used instead of the CASS/GRAB ray-trace results in situations where the bathymetry is range independent. When applied to appropriate meteorological data using the selected bottom and surface reflection models and databases, the analytic VND model provides a way of calculating the magnitude of noise arriving from any direction to any point within the selected region, just as the extensive CASS/GRAB ray-trace results do in more challenging environments.

The conversion of the VND model to a CSD matrix for the sonar array at the selected location within the selected region may be done analytically by, for instance, using the formulations of Harrison et al in "Computation of noise directionality, coherence and array response in range dependant media", J. Comp. Acoust. 9 (2) p327 (2001), the contents of which are hereby incorporated by reference, and the sonar system data specified by the user.

The wind-wave CSD matrix may then be used by the array response module 26 to model the acoustic performance of the specified sonar array in the selected environment. The results of this modeling may then be viewed by the user via the GUI 12. The tool-bar 20 typically includes options such as "Environment", "Eigenrays", "Pressure", "Reverberation" and "Signal Excess", that allow the user to see details of the modeling and related calculations such as, but not limited to, calculated or determined bathymetry and sound speed profiles, eigenray results, and pressure results. (Eigenray results typically plot arrival angle intensities at a given frequency for the selected scenario). The results may also be viewed as beam patterns versus steering angle plots.

If the effect of one or more vessels is to be included in the simulation, the CASS/GRAB module 42 may use appropriate shipping related data such as, but not limited to, the input data on vessel location, bearing and speed as well as the known vessel noise generation characteristics from shipping databases 46 to produce appropriate ray tracing. In the preferred embodiment, the shipping databases include the HITS (Historical Temporal Shipping) as described in "Oceanographic And Atmospheric Master Library Summary" (U), Naval Oceanographic Office report OAML-SUM-21J, October 2001, Section 3.11 and other databases and sources such as, but not limited to, "Acoustic source levels of commercial vessels for use in sonar system modeling and analysis", Naval Undersea Systems Center, Tech. Memo 901157, August 1990. The results of the CASS/GRAB ray tracing may then be used by the shipping noise VND module 37 to create a shipping noise VND model. This shipping noise VND model may then be used by the shipping noise CSD module 36, along with the relevant sonar array data, to generate a shipping noise CSD matrix. This may be accomplished by, for instance, using the following mathematics:

For a ship at a given range, consider that there are M eigenrays to the center element of an array of N elements. Letting p be the complex pressure matrix of size N×M, each element of this matrix p is evaluated for element n and ray in as:

$$p_n^m = a_m \cdot \exp(i(k_x^m x_n + k_y^m y_n + k_z^m z_n)) \quad (4)$$

where, $a_m$ represents the received level pressure amplitude, and the terms in the exponential are the plane-wave arrival vectors for each element position for the given ray m. Ignoring any multi-path interference, the cross-spectral density matrix for a single ship s is simply:

$$R_{SHIP(s)} = p\, p'  \qquad (5)$$

and the total cross-spectral density matrix for all ships is:

$$R_S = \sum_{s=1}^{\infty} R_{SHIP(s)}  \qquad (6)$$

The typically anisotropic shipping noise CSD matrix calculated using equation (6) may then be added incoherently with the typically anisotropic wind-wave noise CSD matrix calculated by the wind-wave noise CSD module 32 and used by the array response module 26 to simulate the sonar performance in the presence of a specific shipping realization in the selected location.

Similarly, if a target is specified by the user, the CASS/GRAB module 42 may be used to generate appropriate ray-tracing using appropriate data and models from the environmental databases 38, the shipping databases 30 and the bathymetry databases 34. That ray tracing may then be used by the target VND module 29 to create a target VND model. This may then be use by the target CSD module 28 to generate a target CSD matrix for the specific sonar array, which can be used by the array response module 26.

Figure 2:
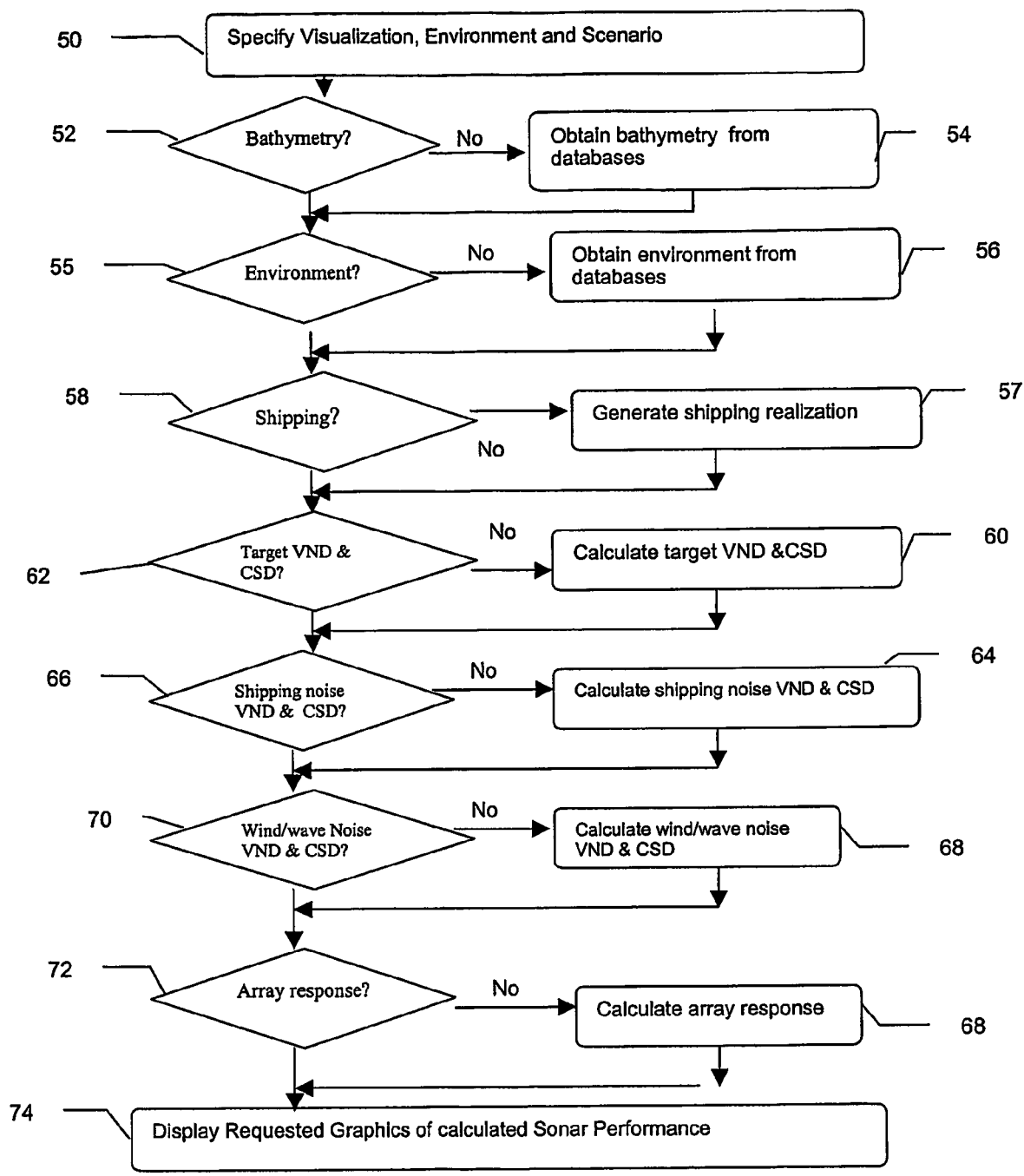
FIG. 2 is a flow diagram illustrating one method of the present invention.

FIG. 2 is a flow diagram showing an exemplary method of a preferred embodiment of the invention. The simulation of the sonar system performance begins at step 50 in which the user specifies the visualization, the environment and the scenario. As detailed above, specifying the visualization may include selecting a region of the world and a date or time of year. Specifying the environment may include specifying the databases and models to be used in calculating the sonar system performance such as, but not limited to the surface and bottom reflectivity models, and the bathometric, environmental and shipping databases to be used. For each possible choice, there is typically a default, as described in detail above. Specifying the scenario may include specifying the sonar system, including elements such as, but not limited to, an array type, a position and a frequency response, the array's location within the selected region as well as any targets and shipping to be taken into account.

Once the relevant parameters required in step 50 have been specified, the system begins the calculation of the sonar's predicted performance. In step 52, the system looks for appropriate bathymetry for the selected region. If these are not currently located in the system, the system acquires or generates them using default or specified bathymetric databases in step 54. Once the necessary bathymetry has been obtained the system proceeds to step 55. If the data for the specified environment is not available, the necessary data is obtained from the environmental databases in step 55.

In step 58, the system check if a shipping realization has been generated. If one is required but not available, the system causes one to be generated in step 57.

In step 62, the system checks if a target VND model and associate CSD matrix is required, and if so, if it is available. If they required, but not yet available, they are generated in step 60. For complex bathymetric environments, this typically involves appropriate CASS/GRAB ray-tracing from the target to the receiver location.

In step 66, the system checks if a shipping noise VND model associated CSD matrix is required, and if so, if it is available. If they are required, but not yet available, they are generated in step 64. In complex bathymetric environments, this typically involves appropriate CASS/GRAB ray-tracing to model sound propagation from the ships specified in the shipping realization to the sonar location by all appropriate paths.

In step 70, the system looks for a wind-wave noise VND and associated CSD matrix for the specified sonar at the selected location within the selected region. If none are found, a wind-wave noise VND model may be calculated using appropriate CASS/GRAB module ray-tracing of sound propagating from representative wind-wave noise sources to the sonar location via all appropriate paths. The wind-wave noise CSD matrix may then be calculated using this VND in conjunction with the specified sonar array.

Once the system has all necessary cross-spectral density matrices, the system may check to see if an array response is required, and if it is, but is not yet calculated, go to step 72 in which the array response module calculates the performance of the array using them. Once results are available, step 74 allows the user to view them as, for instance, graphic displays of various plots including, but not limited to beam patterns versus steering angle plots.

Figure 3:
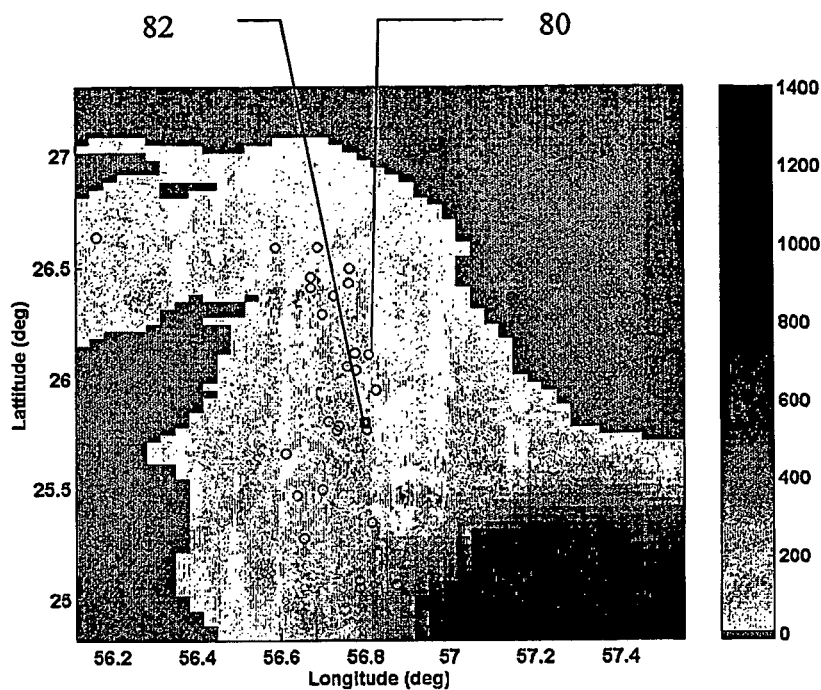
FIG. 3 is a representative bathymetry overlaid with a representative shipping realization.

FIG. 3 is a representative bathymetry of a region. The horizontal axis shows the longitude of the region in degrees, and the vertical axis shows the latitude of the region in degrees. The gray scale of the bathymetry represents ocean depth in meters corresponding to the legend bar on the right of the diagram. A representative shipping realization is show by the circles 80, each of which represents the location of a ship. The square 82 represents the location of the sonar array.

Figure 4:
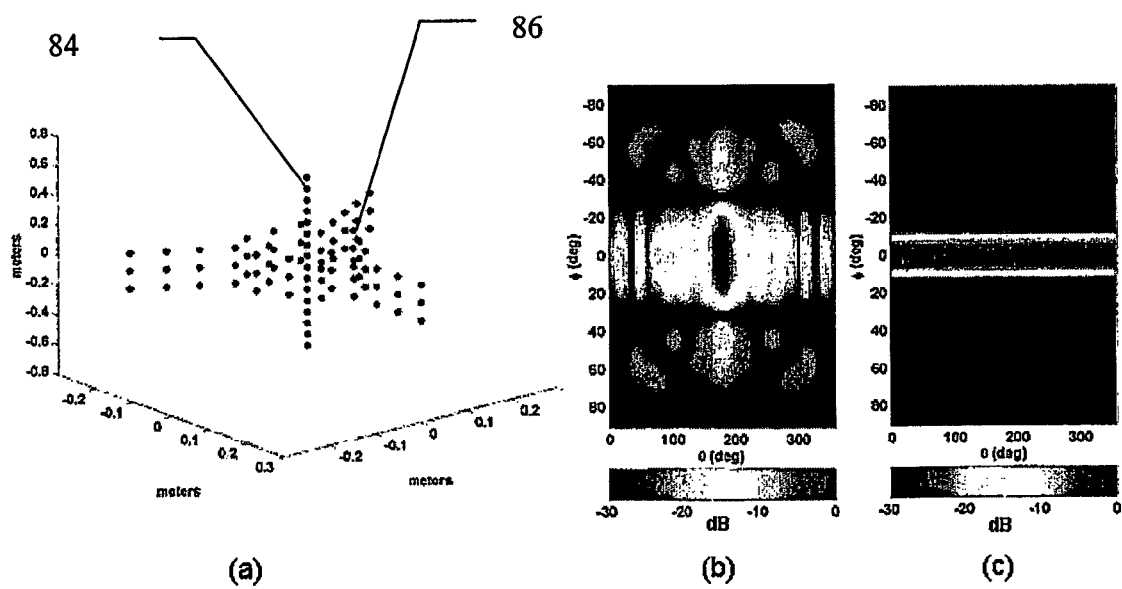
FIG. 4a shows element positions of two representative sonar arrays.
FIGS. 4b and c are representative beam pattern plots.

FIG. 4a shows two representational sonar array element positions. The gray dots 84 represent the element positioning of a vertical line array (VLA) and gray dots 86 represent a 3 plane, 72 element volumetric sonar array.

FIG. 4b shows a beam pattern for the volumetric array of FIG. 4a in which the gray scale represents response in decibels, as shown in the key at the bottom of the diagram. The horizontal axis shows beam steering in azimuth (i.e. around a vertical axis) in degrees. The vertical axis shows beam steering in the vertical (i.e. around a horizontal axis) in degrees. FIG. 4c shows a beam pattern for the VLA sonar array of FIG. 4a.

The above-described steps can be implemented using standard well-known programming techniques. The novelty of the above-described embodiment lies not in the specific programming techniques but in the use of the steps described to achieve the described results. Software programming code which embodies the present invention is typically stored in permanent storage of some type, such as permanent storage of a workstation located at JHU/APL. In a client/server environment, such software programming code may be stored with storage associated with a server. The software programming code may be embodied on any of a variety of known media for use with a data processing system, such as a diskette, or hard drive, or CD-ROM. The code may be distributed on such media, or may be distributed to users from the memory or storage of one computer system over a network of some type to other computer systems for use by users of such other systems. The techniques and methods for embodying software program code on physical media and/or distributing software code via networks are well known and will not be further discussed herein.

It will be understood that each element of the illustrations, and combinations of elements in the illustrations, can be implemented by general and/or special purpose hardware-based systems that perform the specified functions or steps, or by combinations of general and/or special-purpose hardware and computer instructions.

These program instructions may be provided to a processor to produce a machine, such that the instructions that execute on the processor create means for implementing the functions specified in the illustrations. The computer program instructions may be executed by a processor to cause a series of operational steps to be performed by the processor to produce a computer-implemented process such that the instructions that execute on the processor provide steps for implementing the functions specified in the illustrations. Accordingly, the figures support combinations of means for performing the specified functions, combinations of steps for performing the specified functions, and program instruction means for performing the specified functions.

While the invention has been disclosed in terms of an exemplary embodiment, it will be apparent to one of ordinary skill in the art that many modifications can be made to the disclosed method and apparatus without departing from the spirit of the invention. Therefore, it is the intent of the appended claims to cover all such variations and modifications as come within the true spirit and scope of this invention.

What is claimed:

1. A method of predicting a passive sonar array's performance, comprising:
    selecting a geographical location;
    obtaining a bathymetry for said selected location;
    specifying said passive sonar array;
    generating an anisotropic wind-wave noise cross-spectral density matrix for said passive sonar array at said selected geographic location; and
    calculating a first response curve using said noise cross-spectral density matrix, such that said first response curve characterizes at least one aspect of the performance of said sonar array at said geographic location.

2. The method as recited in claim 1 further comprising:
    defining a target;
    generating a target cross-spectral density matrix for said target; and
    calculating a second response curve using said target cross-spectral density matrix and said noise cross-spectral density matrix, such that said second response curve characterizes at least one aspect of the performance of said sonar array at said location in detecting said target.

3. The method as recited in claim 1 further comprising choosing a date and wherein said generating an anisotropic wind-wave noise cross-spectral density matrix is responsive to said date.

4. The method as recited in claim 1 further comprising:
    providing a shipping realization;
    generating a shipping noise cross-spectral density matrix using said shipping realization;
    calculating a third response curve using said shipping cross-spectral density matrix and said noise cross-spectral density matrix, such that said third response curve characterizes at least one aspect of the performance of said sonar array at said geographic location in the presence of said shipping realization.

5. The method as recited in claim 1 wherein said generating an ambient wind-wave noise cross-spectral density matrix includes using a vertical noise directionality model.

6. The method as recited in claim 5 wherein said vertical noise directionality model comprises ray-tracing results.

7. The method as recited in claim 5 wherein said vertical noise directionality model comprises equations of the form:

$$VND(\phi_r^-) = \frac{A_s \cdot l_D \cdot D(\phi_s)}{\sin\phi_s \cdot (1 - R_s(\phi) \cdot R_b(\phi) \cdot l_C)}$$

and, $$VND(\phi_r^+) = R_b(\phi) \cdot l_{DC} \cdot VND(\phi_r^-)$$

where $\phi_r$ represents the vertical angle at a receiver of the sonar system, measured from the horizontal, $\phi_s$ represents the vertical angle of a surface source measured from the horizontal, $R_s$ and $R_b$ represent surface and bottom plane-wave reflection coefficients respectively, $A_s$ represents a scaled surface source strength applicable to an arbitrary surface source directivity D and the terms $l_D$, $l_C$ and $l_{DC}$ represent the absorptive losses of the surface to receiver ray, the ray path cycle distance and the difference path, respectively.

8. The method as recited in claim 1 in which said passive sonar array is responsive to frequencies in the range of 1 to 20 kHz.

9. The method as recited in claim 1 further including obtaining relevant meteorological and oceanographic data from external databases.

10. An apparatus for predicting a passive sonar array's performance, comprising:
    a computer configured to be capable of:
        receiving a geographical location selection and a passive sonar array specification;
        obtaining a bathymetry for said selected location;
        generating an anisotropic wind-wave noise cross-spectral density matrix for said sonar array at said location; and,
        calculating a first response curve using said wind-wave noise cross-spectral density matrix, said first response curve characterizing at least one aspect of the performance of said sonar array at said location.

11. The apparatus as recited in claim 10, in which said computer is further configured to be capable of:
    receiving a definition of a target;
    generating a target cross-spectral density matrix using said definition; and,
    calculating a second response curve using said target cross-spectral density matrix, said second response curve characterizing at least one aspect of the performance of said sonar at said location in detecting said target.

12. The apparatus as recited in claim 10, wherein said computer is further configured to be capable of receiving a date and wherein said generating an anisotropic wind-wave noise cross-spectral density matrix is responsive to said date.

13. The apparatus as recited in claim 10 in which said computer is further configured to be capable of:
    receiving a shipping realization;
    generating an shipping noise cross-spectral density matrix using said shipping realization;
    calculating a third response curve using said shipping noise cross-spectral density matrix and said noise cross-spectral density matrix, such that said third response curve characterizes at least one aspect of the performance of said sonar at said location in the presence of said shipping realization.

14. The apparatus as recited in claim 10 in which said computer is further configured to use a vertical noise directionality model in calculation said anisotropic ambient noise cross-spectral density matrix.

15. The apparatus as recited in claim 14 wherein said vertical noise directionality model is obtained using raytrace results.

16. A device for predicting a passive sonar array's performance, comprising:
   means for selecting a geographical location;
   means for obtaining a bathymetry for said selected location;
   means for specifying a passive sonar array;
   means for generating an anisotropic wind-wave noise cross-spectral density matrix for said sonar array at said location;
   means for calculating a first response curve using said noise cross-spectral density matrix, said first response curve characterizing at least one aspect of the performance of said sonar arrray in said geographic location.

17. The device as recited in claim 16 further comprising:
   means for defining a target;
   means for generating a target cross-spectral density matrix for said target; and
   means for calculating a second response curve using said target cross-spectral density matrix and said noise cross-spectral density matrix, such that said second response curve characterizes at least one aspect of the performance of said sonar array at said location in detecting said target.

18. The device as recited in claim 16 further comprising means for choosing a date and wherein said means for generating an anisotropic wind-wave noise cross-spectral density matrix is responsive to said date.

19. The device as recited in claim 16 further comprising:
   means for providing a shipping realization;
   means generating a shipping noise cross-spectral density matrix using said shipping realization; and
   means for calculating a third response curve using said shipping cross-spectral density matrix and said noise cross-spectral density matrix, such that said third response curve characterizes an aspect of the performance of said sonar array at said geographic location in the presence of said shipping realization.

20. The device as recited in claim 16 wherein said means for generating an anisotropic ambient noise cross-spectral matrix uses a vertical noise directionality model.

21. The device as recited in claim 20 wherein said vertical noise directionality model comprises ray-tracing results the surface to receiver ray, the ray path cycle distance and the difference path, respectively.

22. A computing device comprising instructions for: selecting a geographical location; obtaining a bathymetry for a selected location; specifying said passive sonar array; generating an anisotropic wind-wave noise cross-spectral density matrix for said passive sonar array at said selected geographic location; and calculating a first response curve using said noise cross-spectral density matrix, such that said first response curve characterizes at least one aspect of the performance of said sonar array at said geographic location.

* * * * *